(12) United States Patent
Justice

(10) Patent No.: US 6,829,595 B2
(45) Date of Patent: Dec. 7, 2004

(54) MICROTRAC INTERNET BILLING SOLUTIONS

(75) Inventor: James R. Justice, San Francisco, CA (US)

(73) Assignee: Valista, Inc. (IE)

( * ) Notice: Subject to any disclaimer, the term of this patent is extended or adjusted under 35 U.S.C. 154(b) by 84 days.

(21) Appl. No.: 09/106,054

(22) Filed: Jun. 26, 1998

(65) Prior Publication Data

US 2001/0049630 A1 Dec. 6, 2001

Related U.S. Application Data

(60) Provisional application No. 60/051,103, filed on Jun. 27, 1997, and provisional application No. 60/051,166, filed on Jun. 27, 1997.

(51) Int. Cl.[7] .............................................. G06F 17/60
(52) U.S. Cl. .......................................... 705/64; 705/65
(58) Field of Search ....................... 395/188.01, 200.54; 705/37, 44, 40, 39, 26, 64, 65; 709/229; 340/825.31, 825.34; 713/200, 201; 380/270

(56) References Cited

U.S. PATENT DOCUMENTS

| | | | |
|---|---|---|---|
| 4,578,530 A | 3/1986 | Zeidler | 178/22.09 |
| 4,799,156 A | 1/1989 | Shavit et al. | 705/26 |

(List continued on next page.)

FOREIGN PATENT DOCUMENTS

| | | | |
|---|---|---|---|
| JP | 6-23904 A1 | | 9/1994 |
| WO | WO96/05549 | * | 2/1996 |
| WO | WO 97/03410 | | 1/1997 |
| WO | WO/9740615 | | 10/1997 |

OTHER PUBLICATIONS

Microsoft Unvells Electronic Commerce Solution; Nov. 4, 1996; Newsletter Report on Microsoft, v4, n21, pN/A.*
Sirbu et al, "NetBill: An Internet Commerce System Optimized for Network Delivered Services", Carnegie Mellon University, Oct. 1994, pp. 20–25.
Sibert et al, "The DigiBox: A Self–Protecting Container for Information Commerce", Electronic Publishing Resources, Inc., First USENIX Workshop on Electronic Commerce, Jul. 1995, pp. 171–183.

Primary Examiner—James P. Trammell
Assistant Examiner—Pierre E. Elisca
(74) Attorney, Agent, or Firm—Gray Cary Ware & Freidenrich LLP

(57) ABSTRACT

A method for authenticating internet billing using a third party account server. Internet users maintain authentication information such as user PIN codes with a third party account server. An internet user seeking to purchase from and an internet vendor is linked to a third party account server and transmits the appropriate authentication information to the account server for approval. The account server then approves or disapproves the transaction based on the validity of the authentication information that it receives from the user.

8 Claims, 2 Drawing Sheets

U.S. PATENT DOCUMENTS

| | | | |
|---|---|---|---|
| 4,947,028 A | | 8/1990 | Gorog ......................... 235/380 |
| 4,992,940 A | | 2/1991 | Dworkin ....................... 705/26 |
| 5,446,489 A | | 8/1995 | Egendorf ........................ 348/3 |
| 5,465,206 A | * | 11/1995 | Hilt et al. .................... 364/406 |
| 5,557,518 A | * | 9/1996 | Rosen ........................ 364/408 |
| 5,655,089 A | | 8/1997 | Bucci .......................... 395/240 |
| 5,671,279 A | | 9/1997 | Egamal ........................ 380/23 |
| 5,699,528 A | | 12/1997 | Hogan ........................... 705/40 |
| 5,710,884 A | * | 1/1998 | Dedrick .................. 395/200.47 |
| 5,710,887 A | | 1/1998 | Chelliah et al. ............. 395/226 |
| 5,715,314 A | | 2/1998 | Payne et al. .................. 380/24 |
| 5,715,399 A | * | 2/1998 | Bezos ........................ 395/227 |
| 5,717,917 A | | 2/1998 | Munakata .................... 380/25 |
| 5,724,424 A | | 3/1998 | Gifford ........................ 380/24 |
| 5,727,163 A | | 3/1998 | Bezos .......................... 705/27 |
| 5,745,556 A | * | 4/1998 | Ronen ........................ 375/127 |
| 5,745,884 A | | 4/1998 | Carnegie et al. .............. 705/34 |
| 5,754,655 A | | 5/1998 | Hughes et al. ................ 705/34 |
| 5,757,917 A | * | 5/1998 | Rose et al. .................... 380/25 |
| 5,781,632 A | * | 7/1998 | Odom ........................... 380/24 |
| 5,784,565 A | * | 7/1998 | Lewine .................. 395/200.54 |
| 5,794,221 A | | 8/1998 | Egendorf ..................... 705/40 |
| 5,796,952 A | * | 8/1998 | Davis et al. ............ 395/200.54 |
| 5,799,285 A | | 8/1998 | Klingman ..................... 705/26 |
| 5,802,497 A | * | 9/1998 | Manasse ....................... 705/27 |
| 5,809,144 A | | 9/1998 | Sirbu et al. .................... 380/24 |
| 5,815,665 A | * | 9/1998 | Teper et al. ........... 395/200.59 |
| 5,822,737 A | | 10/1998 | Ogram ........................ 705/26 |
| 5,825,881 A | | 10/1998 | Colvin, Sr. ................... 380/24 |
| 5,826,244 A | | 10/1998 | Huberman ................... 705/37 |
| 5,826,245 A | * | 10/1998 | Sandberg-Diment ......... 705/44 |
| 5,848,396 A | * | 12/1998 | Gerace ........................ 705/10 |
| 5,852,812 A | | 12/1998 | Reeder ........................ 705/39 |
| 5,862,325 A | * | 1/1999 | Reed et al. ............ 395/200.31 |
| 5,872,915 A | * | 2/1999 | Dykes et al. .......... 395/188.01 |
| 5,875,296 A | * | 2/1999 | Shi et al. ............... 395/188.01 |
| 5,884,312 A | * | 3/1999 | Dustan et al. ................ 707/10 |
| 5,897,622 A | * | 4/1999 | Blinn et al. .................... 705/26 |
| 5,899,980 A | | 5/1999 | Wilf et al. .................... 705/26 |
| 5,903,721 A | * | 5/1999 | Sixtux ........................ 713/200 |
| 5,905,736 A | * | 5/1999 | Ronen et al. ................ 370/546 |
| 5,909,492 A | * | 6/1999 | Payne et al. .................. 380/24 |
| 5,931,917 A | * | 8/1999 | Nguyen et al. ............. 709/250 |
| 5,933,811 A | * | 8/1999 | Angles et al. ................ 705/14 |
| 6,263,447 B1 | * | 7/2001 | French et al. ............... 713/201 |
| 6,351,739 B1 | * | 2/2002 | Egendorf ..................... 705/40 |

* cited by examiner

---

WELCOME TO THE UNIVERSAL PIN SIGN UP FORM.

STEP 1: PLEASE FILL OUT THE FOLLOWING SO WE KNOW WHO YOU ARE:

YOUR NETCOM EMAIL ADDRESS

YOUR NETCOM PASSWORD

THE LAST FOUR DIGITS OF YOUR NETCOM BILLING CREDIT CARD
(FOR SECURITY ONLY)

STEP 2: TO PROTECT YOUR ACCOUNT, PLEASE CHOOSE AN INNERBANK PIN

STANDARD PURCHASES                PLEASE REENTER

**MONTHLY ACCOUNT RECORD
FOR: JIM JUSTICE,
412 W. CAMERON AVE
CHAPEL HILL, NC 27516**

YOUR ACCOUNT HAS BEEN BILLED THE FOLLOWING CHARGES:

NETCOM MONTHLY SERVICE CHARGE    19.95

<u>ITEMIZED CHARGES:</u>

BUSINESS WEEK
- 7/2/97    NEWS ARTICLE    .25
- 7/2/97    NEWS ARTICLE    .50

WALL STREET JOURNAL
- 7/3/97    NEWS ARTICLE    .35

BOB'S ARCADE
- 7/10/97    GAME MATERIALS    1.95
- 7/15/97    GAME MATERIALS    1.25

NEXUS INFORMATION SOURCES
- 7/11/97    NEWS ARTICLES    2.50
- 7/12/97    NEWS ARTICLES    1.75
- 7/12/97    NEWS ARTICLES    2.25

FIG. 3

MICROTRAC INTERNET BILLING SOLUTIONS

RELATED APPLICATIONS

This application claims the benefits of U.S. provisional patent application Serial No. 60/051,103, filed 27 Jun. 1997; and U.S. provisional patent application Serial No. 60/051,166, filed 27 Jun. 1997, and hereby incorporates such provisional applications as if fully set forth herein.

MICROTRAC

INTERNET BILLING SYSTEM

The following pages describe an invention to be used for Internet billing, i.e. allowing purchaser to make a payment and a vendor to receive that payment over the Internet. The system includes three main elements: An MicroTrac Server, specific software at a content provider's (vendor's) site, and specific software at the consumer's Internet Access Provider (IAP).

It is the unique interaction of these three elements which comprise the invention. It is not the intention of this paper to describe the specific coding or scripts within the software since these are not the elements being patented—the actual development of the software is elementary, however, the basic function of each of these elements is described and considered pertinent to the function of the invention as a whole.

BACKGROUND

There are currently hundreds of companies throughout the world working toward Internet billing solutions. Many of these companies' systems have been in development for several years and at least twenty products are on the market today. Companies pursuing these billing systems include such major names as IBM, Digital Equipment and AT&T.

Despite this magnitude of interest and investment into Internet billing solutions, a simple, yet unobvious, solution has remained undiscovered, a system which could standardize Internet electronic commerce.

Some Terms Used in this Paper

- Customer Identifier Cookie (CIC): Cookie used to identify the customer to the MicroTrac Account Server
- Special Purchase Cookie (SPC): Cookie used to actually identify a validated customer to purchase goods from a given vendor.
- Content Provider/Vendor/Merchant: This refers to the same entity in this paper—the entity which is providing a good or service to the customer. Technically, merchant does not need to charge the user an actual sum of money for the goods or services, but might only use the system to authenticate a user before distributing goods or services or merely to provide access to information.
- Goods: Any information, data or small services provided by Content Providers.
- IAP: In this paper, an Internet access provider (IAP) refers to the uplink services of the ISP, i.e. that part of the ISP's services which provides users access to the Internet. This does not include the part of an ISP's services which provide hosting of content provider's sites.
- IAPS: IAP software.
- Microbilling: The act of billing for Internet Payments. (see below).
- MicroTrac Account Server: A centralized server which authenticates purchasers to buy from vendor sites and clears (in an accounting sense) the transactions between the vendor and the user's IAP.
- Internet Payment: A payment made by a consumer over the Internet to a merchant for goods or services rendered. An Internet Payment is a transaction in which the customer receives the goods or services in exchange for an obligation of payment, and does not have to be an immediate delivery of currency to the merchant.
- Browser: client side software which allows a customer to send and receive TCP/IP packets over the Internet.
- Customer/Purchaser/User: Anyone who makes a purchase from a Vendor/Merchant.

SUMMARY

The MicroTrac invention uses the existing billing account Information at the IAP (Internet Access Provider) to bill consumers for other internet payments on the Internet Much like long distance companies use the local telephone companies to bill long distance charges.

A third party (MicroTrac) Account Server is used to track internet payments to Content Providers (vendors) on the web using "cookies" that are issued by the either the customer's IAP or the MicroTrac Account Server.[1] Primarily, two types of cookies will be used in the MicroTrac process: a Customer Identifier Cookie (CIC) and a Special Purchase Cookie (SPC). In addition, other cookies may be used—this will be described later.

[1] Cookies can be solely controlled by the MicroTrac Account server—both methods will be described in the following pages.

Simply, a customer requests a pay-for item from a MicroTrac vendor. The MicroTrac Vendor Software forwards (or redirects) the client side software application (browser) to the MicroTrac Account Server which is identified as the "path" attribute for the CIC (see COOKIES—BACKGOROUND AND SPECIFICATION below) and the CIC is forwarded to the MicroTrac server.

The Account Server then request a customer PIN. Upon validation that this is the correct PIN associated with the CIC, a SPC is returned to the customer browser. The SPC "path" attribute is set to the path of the vendor so that the SPC is included in future request from that vendor.

The SPC path attribute may also be set for a common MicroTrac domain (for example microtrac.com) and the vendors registered under that domain with the central agency governing domain listings (in this case, the Internic). In this manner, the cookie will still release to the vendor.

The customer's browser is also automatically forwarded (redirected) back to the vendor's site where the SPC is released to the vendor site, which identifies the user as valid purchaser. The SPC may either be expired at that time by the vendor host or may be expired by dating included in the "expires" attribute (see COOKIES—BACKGROUND AND SPECIFICATION below) This choice will be left to the vendor. The purchase/billing information is forwarded by the vendor software to the Account Server at the completion of the transaction.

Note: A CIC is a semi-permanent cookie which resides in the customer's/client browser (software application) and will probably only be purged at the user's discretion. The SPC is specific to the vendor and/or vendor item be sold and expires either at the of purchase or at a date set in the "expire" attribute. The MicroTrac Account Server may also use other forms of communication with the vendor software to OK the transaction, such as a direct communication using the Internet (or by other means of communication), such that the goods or services purchased by the purchaser are then released to the purchaser. In such a communication, only the user and the transaction need to be identified to the merchant/vendor.

BRIEF DESCRIPTION OF THE DRAWINGS

FIG. 3 is an example of a consolidated monthly billing statement that a user might receive according to another embodiment of the invention.

WHAT ARE "COOKIES?"

Figures 1, 2:
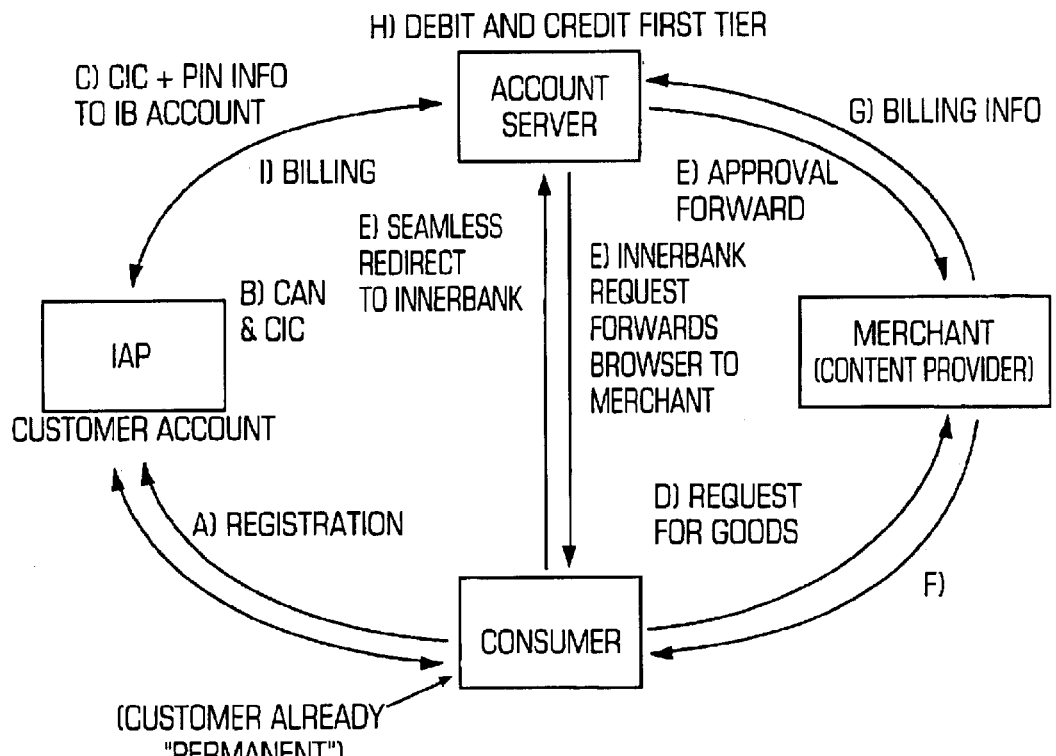
FIG. 1 is a block diagram that shows the interactions between the parties according to an embodiment of the invention.
FIG. 2 is an example of a form by which an internet user may register with the third party account server and provide authentication information.

A server, when returning an HTTP object to a client, may also send a piece of state information which the client will store. Included in that state object is a description of the range of URLs for which that state is valid. Any future HTTP requests made by the client which fall in that range will include a transmittal of the current value of the state object from the client back to the server. The state object is called a cookie, for no compelling reason.

COOKIES—BACKGOROUND AND SPECIFICATION[2]

[2]Partially reprinted from http://home.netscape.com/newsref/std/cookie_spec.html A cookie is introduced to the client by including a Set-Cookie header as part of an HTTP response, typically this will be generated by a CGI script.
Syntax of the Set-Cookie HTTP Response Header
This is the format a CGI script would use to add to the HTTP headers a new piece of data which is to be stored by the client for later retrieval.
Set-Cookie: NAME=VALUE; expires=DATE; path=PATH; domain=DOMAIN_NAME; secure
NAME=VALUE
This string is a sequence of characters excluding semicolon, comma and white space. If there is a need to place such data in the name or value, some encoding method such as URL style % XX encoding is recommended, though no encoding is defined or required.
This is the only required attribute on the Set-Cookie header.
expires=DATE
The expires attribute specifies a date string that defines the valid life time of that cookie. Once the expiration date has been reached, the cookie will no longer be stored or given out.
The date string is formatted as:
Wdy, DD-Mon-YYYY HH:MM:SS GMT
This is based on RFC 822, RFC 850, RFC 1036, and RFC 1123, with the variations that the only legal time zone is GMT and the separators between the elements of the date must be dashes.
expires is an optional attribute. If not specified, the cookie will expire when the user's session ends.
Note: There is a bug in Netscape Navigator version 1.1 and earlier. Only cookies whose path attribute is set explicitly to "/" will be properly saved between sessions if they have an expires attribute.
domain=DOMAIN_NAME
When searching the cookie list for valid cookies, a comparison of the domain attributes of the cookie is made with the Internet domain name of the host from which the URL will be fetched. If there is a tail match, then the cookie will go through path matching to see if it should be sent. "Tail matching" means that domain attribute is matched against the tail of the fully qualified domain name of the host. A domain attribute of "acme.com" would match host names "anvil.acme.com" as well as "shipping.crate.acme.com".

Only hosts within the specified domain can set a cookie for a domain and domains must have at least two (2) or three (3) periods in them to prevent domains of the form: ".com", ".edu", and "va.us". Any domain that fails within one of the seven special top level domains listed below only require two periods. Any other domain requires at least three. The seven special top level domains are: "COM", "EDU", "NET", "ORG", "GOV", "MIL", and "INT".

The default value of domain is the host name of the server which generated the cookie response.
path=PATH
The path attribute is used to specify the subset of URLs in a domain for which the cookie is valid. If a cookie has already passed domain matching, then the pathname component of the URL is compared with the path attribute, and if there is a match, the cookie is considered valid and is sent along with the URL request. The path "/foo" would match "/foobar" and "/foo/bar.html". The path "/" is the most general path.

If the path is not specified, it as assumed to be the same path as the document being described by the header which contains the cookie.
secure If a cookie is marked secure, it will only be transmitted if the communications channel with the host is a secure one. Currently this means that secure cookies will only be sent to HTTPS (HTTP over SSL) servers.

If secure is not specified, a cookie is considered safe to be sent in the clear over unsecured channels.
Syntax of the Cookie HTTP Request Header
When requesting a URL from an HTTP server, the browser will match the URL against all cookies and if any of them match, a line containing the name/value pairs of all matching cookies will be included in the HTTP request. Here is the format of that line:
Cookie: NAME1=OPAQUE_STRING1; NAME2=OPAQUE_STRING2 . . .

METHOD IN DETAIL

The following describes the transaction methodology using the TracNet invention (see FIG. 1): This description should be used as aid in building the system.

a) Registration: Customer accesses the Internet though their IAP and goes (using normal browser functions) to an Internet address containing a registration form most likely supported by the IAP. (See FIG. 2—Sample Registration Form) This form can be presented in any present or future Internet supported language (i.e. html, Java, dhtml etc.)

b) At the time of registration, a Customer Account Number (CAN) is generated. The new account number plus an identifier for the customer's IAP are formed into the CIC, and sent to the customer's browser. The CIC will be used to identify the customer for any future MicroTrac transactions. The CIC contains the following information:
  i) —Identifier for the IAP
  ii) —CAN
  iii) —path="MicroTrac Account Server," such that the CIC is included in packets sent from the customer's browser to the MicroTrac Account Server or any site registered under the primary domain of the Microtrac Account Server.

c) The CAN plus the customer's PIN protection preferences must then be forwarded to the Account Server (centralized computer) and a customer account is formed on the Account Server.

d) When a customer makes a request to a vendor for goods to be purchased, (e) the MicroTrac vendor software (CPS) forwards (redirects) the customer's browser to the Account Server and the CIC is included in the customer's request packet so that the customer is already identified. The Account Server then request a PIN to validate the customer, and upon a positive match issues an SPC to the customer's browser. The customer's browser is forwarded back to the vendor's site. The SPC contains the following information:
  i) —Customer account number.
  ii) —path=The Specific Vendor's Address
  iii) —an approval code e) The Account Server then either forwards the Approval Code to the CPS or the CPS checks the approval code against a database of approval codes on the Account Server.

f) Upon a positive check, the goods are sent to the customer. If the check is negative and the approval code does not match the CIC, the customer is refused delivery of the goods.

g) After delivery, a transaction record, which includes the billing information is forwarded back to the Account Server.

h) On the Account Server, a Content Provider payable account is debited for the Content Provider and an IAP receivable account is credited for the amount of the charge.

i) Billing Information is forwarded to the MicroTrac IAP software and the IAP records a receivable for customer. The customer is billed by the IAP.

Notes: Technically, due to the ubiquity of the Internet, the IAP software can physically reside anywhere, including at the MicroTrac Account Server.

Cookies are often stored in the memory cache of the browser. If the customer clears the cached memory in their browser, then, for obvious reasons, steps A through C above must be repeated before further transactions can occur.

At the end of a billing period (probably monthly):

1. The charge is added to the consumer's IAP bill (see FIG. 3—Sample Account Statement)
2. The IAP is awarded a commission and forwards the balance for all of the month's sales to MicroTrac.
3. MicroTrac takes a commission and balances accounts with all MicroTrac content providers.

Advantages of the MicroTrac Method

1. MicroTrac is a friendly and familiar process for making internet payments over the Internet. The technology adds the customer microbilling to the customer's monthly ISP bill that they are already receiving. This mirrors long distance telephone billing which has been used for decades and is a familiar process to the consumer.
2. The MicroTrac method requires no additional software at the consumer level. Most browsers currently used by users of the public computer communications network (like the Internet) have the ability to accept and use cookies as defined above. Thus, no additional software is needed on the client (purchaser) computer. (Unlike every other internet payment method proposed today) A user can be up and running in minutes.
3. MicroTrac consumers do not need to purchase their money before spending it, tying up funds and deterring participation. A small amount of credit is inherent since they have already formed an account at the IAP, much like a telephone billing arrangement.
4. Security is inherent in the design of the MicroTrac system—built in user authentication. The unique interaction between the CIC and SPC serve not only as an excellent method for tracking payments but also as an excellent method for user authentication.
5. The MicroTrac System is highly efficient . . .
  a) Consumers' purchases are aggregated adding economic efficiency for the business entities and simplicity for the consumer. The consumer can view a monthly account summary, just like a telephone bill.
  b) Content Providers Sales and Consumer purchases are also aggregated into simple A/R and A/P accounts at the MicroTrac Account Server adding additional efficiency. Accounts are balanced periodically.

Background and Economics

Recently, many a business man has been asking the same question, "How can I make money on the Internet?"

There are currently two main problems with the World Wide Web as a revenue source for content providers:

1) The WWW is a poor medium for advertising.
2) The Internet is an inefficient medium for billing in small increments.

Content packagers such as AOL and CompuServe have overcome the second problem by making arrangements with many individual content providers. These providers are paid for the timed usage of their content by the premium services which subsequently charge their users by the hour. By "packaging" the content from many suppliers into a single service, premium service users gain the advantage of having many information resources available, even though they will never use all of them. Most of the information a member does access will be used sparsely.

Standard Internet access, however, does not include access to these premium services. The Wall St. Journal, for example, charges users an additional subscription fee of $5/month for access to its stories. Business Week charges $2 per story which is billed at each site visit. Each of these companies is unwilling to cannibalize existing revenues from traditional media in exchange for less profitable revenue from web advertising.

The question then remains—How can a standard Internet user gain access to a wide variety of premium information at a fair price and how can the information supplier be simultaneously fairly compensated for that information?

Tracking Versus Metering Internet Payment Models

Most of the current internet payment (microbilling) models tend to use metering type techniques which require the consumer to purchase credit (cybercoins, cybercash etc.) from a third party provider before spending is possible. The MicroTrac model is a tracking type system which allows a consumer the ability to use the Internet much like a long distance phone. Usage is tracked and billed later.

Advantages of a Tracking System

Tracking provides the consumer with a more seamless method for making internet payments on the Internet. Before a user makes a purchase, they may simply be notified that proceeding further will incur a small charge (password protection can be optional). In contrast, the user of the metering type systems must go to a third party web site, actively purchase credit for a lump sum, and enter passwords when spending the credits at a participating site. Using a tracking type system, consumer will be more likely to participate in microbilling.

Disadvantages of a Tracking System

A tracking system is higher risk for the provider since it relies on giving the consumer open credit. While the metering model reduces the risk of the service providers by taking payment up-front, a tracking system charges the consumer periodically. This risk can be hedged, however, by placing stop ceilings on each individuals account. These stop ceilings can automatically process the charge when a consumer's credit reaches a certain level.

A tracking system has been long proven effective by long distance companies who have used it for decades. As the MicroTrac service is described below, the risk for MicroTrac should actually be less than that of a long distance company since MicroTrac will already have a charge card account set up for every customer. Long distance phone companies do not have this luxury and must rely on faithful payments from their customers.

As shown in the following methodology description, the MicroTrac tracking method has another advantage in that it requires no special hardware or software on the user's computer. The consumer must merely agree to activate their account to begin using the service.

IAP Software (IAPS)

The IAP software will be a wholly unique offering of MicroTrac. The IAPS interacts with the Account Server (below) and serves several functions:

- It allows the IAPs to sign-up consumers for the MicroTrac system and potentially issues the CICs.
- Provides a friendly user interface for the consumer to manage their account including PIN management and parental control.
- The IAP software will maintain the consumers account which tracks the customer's usage throughout a particular period.
- Generates activity reports for the IAP.
- Can automatically run a charge if the consumer exceeds a predetermined spending limit.
- Provides interim account activity reports for customers.
- Manages Simple LAN accounts as described below. (Corporate and Institutional (LAN) Accounts)

MicroTrac Account Server

The MicroTrac Account Server will serve in three different capacities: 1) as an account clearing house, 2) as a billing validation system and 3) as a usage tracking system for the first tier clients.

As a Usage (purchase) Tracking System: All usage during a customer's particular section is reported to the MicroTrac server which routes the information to the IAP software which maintains the customer's periodic billing record.

As a Validation (authentication) System: The MicroTrac Account Server uses the unique interaction of the CIC and SPC as described above to help assure that the customer which is using the system is the authorized customer to use the system. The ultimate responsibility is the customer's, who must keep his PINs confidential.

As an Account Clearinghouse: This server acts as a clearinghouse between the Content Provider and the IAP billing element. The Account Server maintains a payable account for the Content Provider and a receivable account for the IAPs. At the end of each period (probably a month) each account is cleared by billing the IAP and paying the Content Provider. The LAP will be billed at a discount so that the IAP will retain a commission on the sale and MicroTrac will take a commission before paying the Content Provider. A predetermined "allowance for bad debt" will be added as well. Certain vendor categories may be charged a slightly higher allowance for bad debt based on expected bad debt contribution. (Adult sites, for example may be charged a higher rate)

As stated above, due to the ubiquity of the Internet, the IAPS does not have to physically reside at the IAP, but can reside anywhere on the Internet accessible by the IAP, including at the MicroTrac Account Server.

Content Provider Software (CPS)

This software interacts with the Account Server (above) to provide and measure a client's usage of premium information on that site. It's primary functions are as follows:

- To perform an authentication of the purchaser at a time of purchase using the CIC and PIN.
- check for approval codes before issuing the goods to the consumer.
- Each content provider is assigned a site category number which is used to identify the type of site it is, i.e. informational, adult, game. This is used for access control (see Personal Identification Number, Parental and Access Control below). This site category number identifies which type of sites the user (consumer) has decided to password protect.
- Generates usage reports for the Content Provider Password Protection, Parental and Access Control When a consumer initiates a MircoTrac account, they will be prompted to choose a password (PIN) protection for different types of vendor sites. PIN protection will likely be broken into four categories:

1. General—a main PIN number for any purchases
2. Adult
3. Games
4. Maximum transaction size.

Thus, an MicroTrac customer can simply design tiers of spending abilities by assigning different PINs to different types of services. The system will be designed so that at sign-up, the user may choose to have a category use the same PIN as the general PIN or may choose to have a unique PIN for that category. For example: The user may choose to control access to adult sites but allow small game purchases. He could then assign a PIN to games which he gives to his children but assigns a PIN to adult sites which he naturally keeps to himself. The user might also be offered the option to assign monthly spending limits to each category. (not shown on sample above).

Accounts will only require the entry of a PIN, not a user name and PIN. The Account Server will automatically know the identity of the individual due to the tracking number, so a user name is not necessary. To ensure simplicity, the PIN could be limited to four or five numbers.

I claim:

1. A method for authenticating an online purchasing transaction over an internet between an internet user site and a vendor site using a third party account server site, said method comprising the steps of:

linking said internet user site to said account server site, said account server site being different from said vendor site, and wherein said linking includes redirecting a browser associated with said internet user site from the vendor site to the account server site;

sending a request for predetermined authentication information from said account server site to said internet user site;

generating by said account server site in response to receipt of said predetermined authentication information from said internet user site an approval signal for said vendor site for said purchasing transaction;

communicating the approval signal to said browser associated with said internet user site from said account server site for forwarding to said vendor site; and redirecting said browser associated with said internet user site from said account server site to said vendor site with said approval signal for said purchasing transaction.

2. A method as recited in claim 1, wherein said predetermined authentication information is maintained for authentication purposes at said account server site so as to be inaccessible to entities other than said internet user.

3. A method as recited in claim 1, wherein said predetermined authentication information includes a personal identification code uniquely corresponding to the internet user, said personal identification code being a function at least in part of input provided by said internet user to said account server site.

4. A method as recited in claim 1 further comprising the steps of:

storing a record of said purchasing transaction by said account server site; and periodically providing an account statement reflecting an aggregate of purchasing transaction records to a billing service provider for the billing of said internet user.

5. A method as recited in claim 4, wherein said billing service provider is an internet access provider for said internet user.

6. A method as recited in claim 1, wherein said vendor site provides a purchased good or service to the internet user after the generation of the approval signal by said account server site.

7. A method as recited in claim 1 further comprising the steps of:

storing a record of said purchasing transaction by said account server site; and periodically debiting a billing service provider for said internet user according to an aggregate of purchasing transaction records.

8. A method as recited in claim 1 further comprising the steps of:

storing a record of said purchasing transaction by said account server site; and periodically crediting said vendor site according to an aggregate of purchasing transaction records.

* * * * *